(12) United States Patent
Nishida

(10) Patent No.: US 9,957,884 B2
(45) Date of Patent: *May 1, 2018

(54) CONDENSED WATER SUPPLY CONTROL APPARATUS FOR IN-CYLINDER INJECTION TYPE INTERNAL COMBUSTION ENGINE

(71) Applicant: TOYOTA JIDOSHA KABUSHIKI KAISHA, Toyota-shi, Aichi-ken (JP)

(72) Inventor: Kentaro Nishida, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/031,784

(22) PCT Filed: Nov. 6, 2014

(86) PCT No.: PCT/JP2014/079431
§ 371 (c)(1),
(2) Date: Apr. 25, 2016

(87) PCT Pub. No.: WO2015/072390
PCT Pub. Date: May 21, 2015

(65) Prior Publication Data
US 2016/0245164 A1     Aug. 25, 2016

(30) Foreign Application Priority Data

Nov. 15, 2013   (JP) .................................. 2013-236988

(51) Int. Cl.
*F02B 47/02*     (2006.01)
*F02M 25/028*    (2006.01)
(Continued)

(52) U.S. Cl.
CPC ............ *F02B 47/02* (2013.01); *F02D 35/023* (2013.01); *F02D 41/26* (2013.01); *F02M 25/028* (2013.01);
(Continued)

(58) Field of Classification Search
CPC ....... F02B 47/02; F02B 31/006; F02M 26/22; F02M 25/0222; F02M 25/0227;
(Continued)

(56) References Cited

U.S. PATENT DOCUMENTS

| 7,178,486 B2 | 2/2007 | Hupli et al. |
| 7,581,528 B2 * | 9/2009 | Stein ................... F02D 19/0628 123/304 |

(Continued)

FOREIGN PATENT DOCUMENTS

| JP | 2009-138661 A | 6/2009 |
| JP | 2009138661 A * | 6/2009 |

(Continued)

OTHER PUBLICATIONS

Notice of Allowance and Notice of Allowability issued in U.S. Appl. No. 15/032,152 dated Nov. 24, 2017.
(Continued)

*Primary Examiner* — Hung Q Nguyen
*Assistant Examiner* — Anthony Taylor, Jr.
(74) *Attorney, Agent, or Firm* — Finnegan, Henderson, Farabow, Garrett & Dunner, LLP

(57) ABSTRACT

A condensed-water supply control apparatus is applied to an in-cylinder injection type internal combustion engine (1) where fuel is injected from a central area (2a) lying in a cylinder (2). The condensed-water supply control apparatus comprises: a storage tank (21) storing condensed water (CW) generated in the internal combustion engine (1); and a condensed-water supply mechanism (22) which is capable
(Continued)

of supplying the condensed water stored in the storage tank (21) into the cylinder (2), and also controlling the supply amount of condensed water (CW) to a central area (2*a*) and the supply amount of condensed water (CW) to a peripheral area (2*b*), and in a low load state of the internal combustion engine (1), opens an adding water valve (27) and closes an adding water valve (26) so that the condensed water (CW) is supplied limitedly to the peripheral area (2*b*) of the cylinder (2).

8 Claims, 4 Drawing Sheets

(51) Int. Cl.
*F02M 26/22* (2016.01)
*F02D 35/02* (2006.01)
*F02D 41/26* (2006.01)
*F02M 25/022* (2006.01)
*F02M 25/03* (2006.01)
*F02B 31/00* (2006.01)
*F02M 35/108* (2006.01)

(52) U.S. Cl.
CPC .... *F02M 25/0222* (2013.01); *F02M 25/0227* (2013.01); *F02M 25/03* (2013.01); *F02M 26/22* (2016.02); *F02B 2031/006* (2013.01); *F02M 35/1085* (2013.01); *Y02T 10/121* (2013.01)

(58) Field of Classification Search
CPC .. F02M 25/028; F02M 25/03; F02M 35/1085; F02D 35/023; F02D 41/26; Y02T 10/121

USPC ...................................................... 123/25 C
See application file for complete search history.

(56) References Cited

U.S. PATENT DOCUMENTS

| | | | |
|---|---|---|---|
| 7,730,872 B2* | 6/2010 | Leone | ..................... F01N 11/00 123/25 C |
| 7,739,985 B2* | 6/2010 | Keays | ..................... F02B 47/02 123/25 C |
| 7,938,103 B2 | 5/2011 | Keays | |
| 8,935,996 B2 | 1/2015 | Mulye | |
| 2007/0215110 A1 | 9/2007 | Stein et al. | |
| 2012/0298071 A1* | 11/2012 | Horibe | ................ F02B 23/0651 123/299 |
| 2013/0054119 A1 | 2/2013 | Yokota et al. | |
| 2015/0122237 A1 | 5/2015 | Kato | |
| 2016/0032870 A1 | 2/2016 | Nishida | |
| 2016/0115861 A1 | 4/2016 | Ito et al. | |

FOREIGN PATENT DOCUMENTS

| | | |
|---|---|---|
| JP | 2011-111897 | 6/2011 |
| WO | WO 2014/174644 A1 | 10/2014 |
| WO | WO 2014/199475 A1 | 12/2014 |

OTHER PUBLICATIONS

Office Action issued in U.S. Appl. No. 15/032,152 dated May 25, 2017.

* cited by examiner

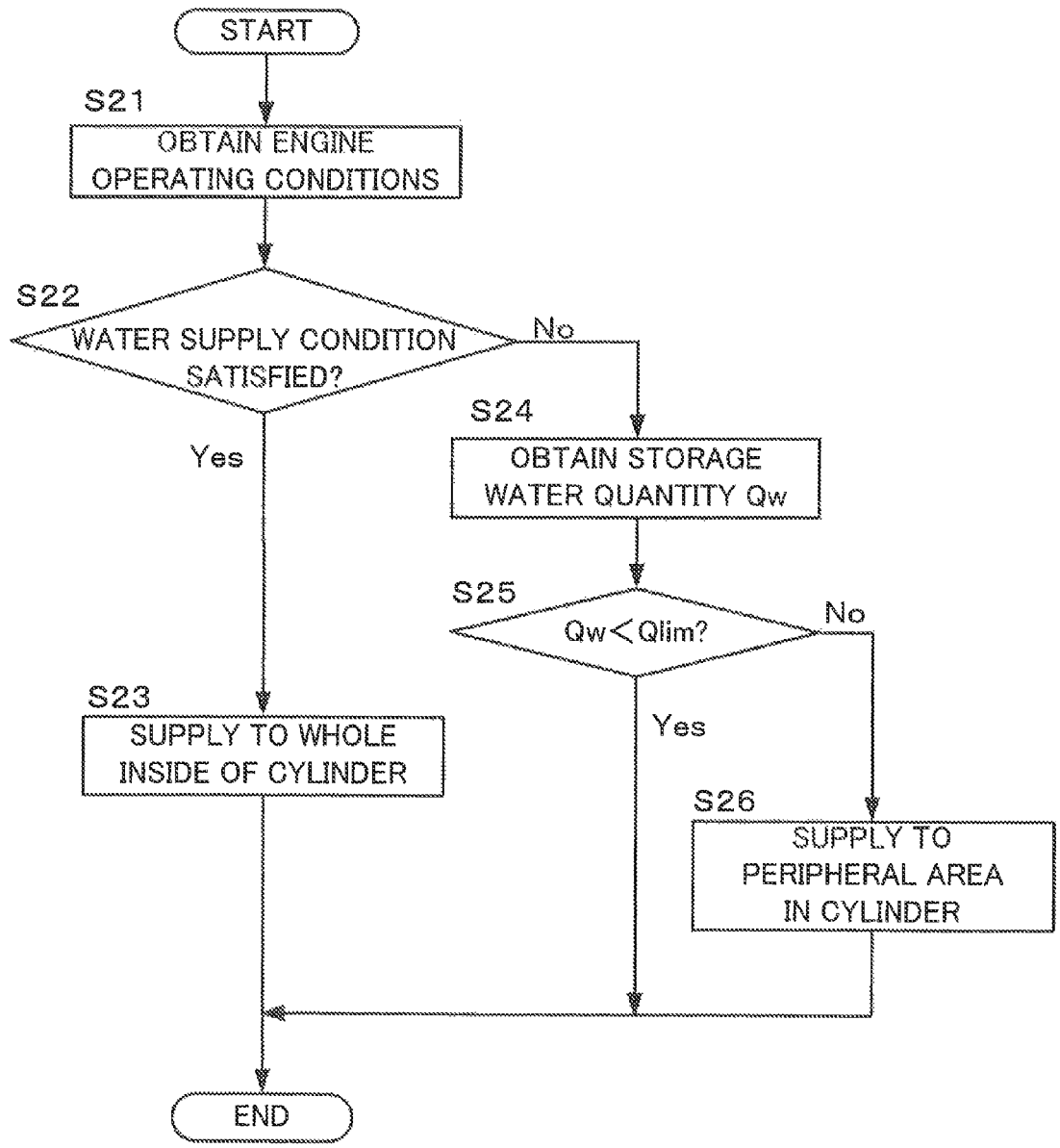

US 9,957,884 B2

CONDENSED WATER SUPPLY CONTROL APPARATUS FOR IN-CYLINDER INJECTION TYPE INTERNAL COMBUSTION ENGINE

CROSS-REFERENCE TO RELATED APPLICATIONS

This application is a national phase application of International Application No. PCT/JP2014/079431, filed Nov. 6, 2014, and claims the priority of Japanese Application No. 2013-236988, filed Nov. 15, 2013, the content of both of which is incorporated herein by reference.

TECHNICAL FIELD

The present invention relates to a condensed water supply control apparatus which supplies condensed water into a cylinder of an in-cylinder injection type internal combustion engine.

BACKGROUND ART

There is known to be a condensed water supply control apparatus applied to a diesel engine which is an in-cylinder injection type internal combustion engine, in which condensed water generated in an EGR cooler is supplied into the cylinder via an intake passage to improve the exhaust characteristic (see Patent Literature 1).

CITATION LIST

Patent Literature

PTL1: JP-A-2011-111897

SUMMARY OF INVENTION

Technical Problem

In various kinds of operating conditions, for supplying condensed water effectively, it is necessary to supply the condensed water while managing the remaining amount of suppliable condensed water. If the condensed water is led into the cylinder in whole in a low load state of the internal combustion engine, the density in the in the cylinder, that is, the density of gas filled in the cylinder decreases. Due to this, it is suppressed to decrease spray penetration of fuel spray in the cylinder. Therefore, the fuel would stick on the wall surface of the cylinder and the discharge amount of carbohydrate increases. Thereby, the exhaust emission deteriorates. In the control apparatus disclosed by the patent literature 1, in such a situation which makes the exhaust emission deteriorate, it is difficult to consume the condensed water in the cylinder. If such a situation continues, the storage water quantity of a storage tank, where condensed water generated in the internal combustion engine is stored, could reach its limit.

With that problem, the present invention aims to provide a condensed water supply control apparatus for in-cylinder injection type internal combustion engine which is capable of consuming condensed water in a cylinder while suppressing the deterioration of exhaust emission even in a low load state of the internal combustion engine.

Solution to Problem

A condensed-water supply control apparatus as one aspect of the present invention is a condensed-water supply control apparatus for an in-cylinder injection type internal combustion engine, the condensed-water supply control apparatus being applied to the in-cylinder injection type internal combustion engine where fuel is injected from a central area lying in a cylinder, and comprising: a storage tank which stores condensed water generated at the in-cylinder injection type internal combustion engine; a condensed water supply device which is configured to supply the condensed water stored in the storage tank into the cylinder, and also to adjust a supply amount of condensed water supplied to the central area lying in the cylinder and a supply amount of condensed water supplied to a peripheral area lying in the cylinder; and a condensed-water supply control device which is configured to control the condensed water supply device in a low load state of the in-cylinder injection type internal combustion engine, to supply condensed water into the cylinder, so that the supply amount of condensed water supplied to the peripheral area lying in the cylinder is made more than the supply amount of condensed water supplied to the central area lying in the cylinder.

In a case where fuel is injected from the central area of the cylinder, an area where the spray penetration of fuel spray is affected by supply of condensed water into the cylinder is mainly the central area lying in the cylinder, and the spray penetration of fuel spray is less affected by supply of condensed water to the peripheral area lying in the cylinder. According to the above condensed-water supply control apparatus, the supply amount of condensed water supplied to the peripheral area lying in the cylinder is made more than the supply amount of condensed water supplied to the central area lying in the cylinder. Due to this, it is possible to supply condensed water into the cylinder while suppressing the fuel sticking on the cylinder wall by reducing impact on the spray penetration of the fuel spray. Thereby, even in a low load state, it is possible to consume condensed water in the cylinder while suppressing deterioration of exhaust emission.

In one embodiment of the condensed-water supply control apparatus as one aspect of the present invention, the condensed-water supply control device may be configured to control the condensed water supply device to supply the condensed water into the cylinder, in a case where a storage water quantity of the storage tank is in an excessive water state that the storage water quantity is equal to or more than a predetermined quantity. According to this embodiment, it is possible to consume condensed water, in a case where the storage water quantity of condensed water is in the excessive water state in the low load state of the internal combustion engine and the superfluous condensed water is preferably consumed.

In one embodiment of the condensed-water supply control apparatus as one aspect of the present invention, the condensed-water supply control device may be configured to control the condensed water supply device to supply the condensed water limitedly to the peripheral area lying in the cylinder so that the supply amount of condensed water supplied to the peripheral area lying in the cylinder is made more than the supply amount of condensed water supplied to the central area lying in the cylinder. According to this embodiment, by supplying condensed water limitedly to the peripheral area lying in the cylinder, it becomes possible to make the supply amount of condensed water supplied to the peripheral area lying in the cylinder more than the supply amount of condensed water supplied to the central area lying in the cylinder.

In one embodiment of the condensed-water supply control apparatus as one aspect to the present invention, the condensed-water supply control apparatus may comprise as the condensed water supply device: a first intake port which makes intake gas flow into the central area lying in the cylinder; a second intake port which makes intake gas flow into the peripheral area lying in the cylinder; a first supply device which supplies condensed water to at least the first intake port; and a second supply device which supplies condensed water to the peripheral area of the cylinder; and a supply change device which changes a water supply amount of each of the first supply device and the second supply device.

The following features may be applied to the above embodiment. The in-cylinder injection type internal combustion engine may have an intake passage which divides into the first intake port and the second intake port; and the first supply device may be provided to the first intake port lying at downstream farther than a position where the intake passage divides into the first intake port and the second intake port. The second supply device may be provided to the second intake port. Alternatively, The first supply device may be provided so as to face in a direction along the peripheral area lying in the cylinder, the in-cylinder injection type internal combustion engine may have an intake passage which divides into the first intake port and the second intake port; and the second supply device may be provided to the intake passage lying at upstream further than a position where the intake passage divides into the first intake port and the second intake port. According to the above features, it is possible to change the supply amount of water supplied to each of the first intake port and the second intake port which are different in characteristics from each other. Thereby, it is possible to change the state of supplying water into the cylinder.

BRIEF DESCRIPTION OF DRAWINGS

FIG. 4 is a flow chart showing one example of a control routine according to the second embodiment.

DESCRIPTION OF EMBODIMENTS

A First Embodiment

Figure 1:
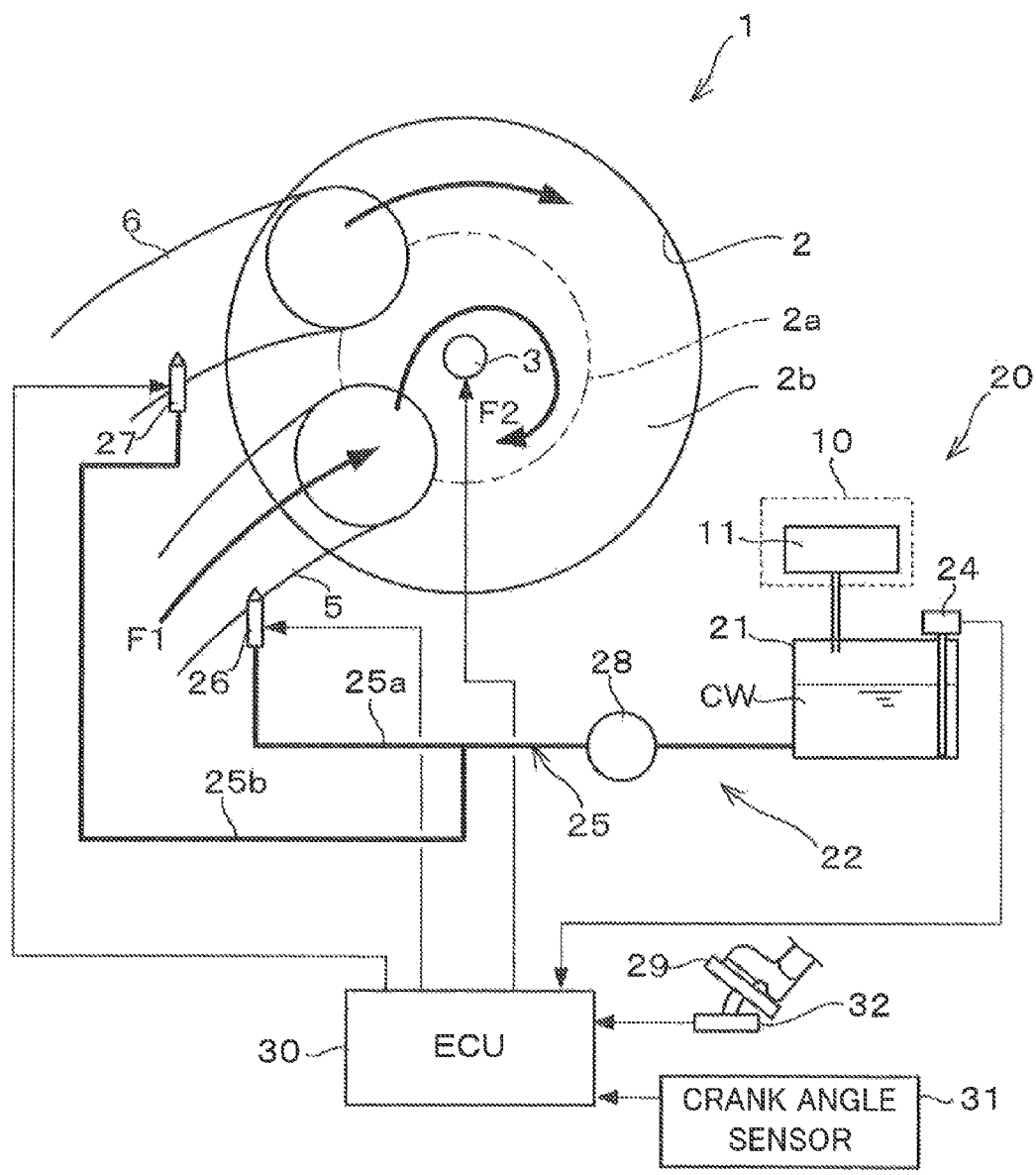
FIG. 1 is a configuration diagram showing schematically an essential portion of an internal combustion engine where a condensed water supply control apparatus according to a first embodiment of the present invention is applied.

As shown in FIG. 1, an internal combustion engine 1 is configured as a diesel engine which is an in-cylinder injection type internal combustion engine. The internal combustion engine 1 has a cylinder 2, and a fuel injection valve 3 is provided at a central area 2a of the cylinder 2. Although only one cylinder 2 is shown in FIG. 1, the internal combustion engine 1 is configured as a serial four-cylinder type internal combustion engine where four cylinders 2 are aligned in one direction. The fuel injection valve 3 injects fuel radially from the central area 2a of the cylinder 2. The cylinder 2 is provided with two kinds of intake ports 5 and 6. Intake gas is led into the cylinder 2 via these intake ports 5 and 6. A first intake port 5 is configured as a well-known helical intake port. As shown by an arrow in FIG. 1, the first intake port 5 makes an intake gas flow into the central area 2a of the cylinder 2 as a swirling flow F2 by adding rotation to an intake flow F1. On the other hand, a second intake port 6 is configured as a well-known tangential intake port. The second intake port 6 leads intake gas flow so that the intake gas flows along an inner circumference of the cylinder 2 to make the intake gas flow into a peripheral area 2b of the cylinder 2.

After being led via the intake ports 5 and 6 into and filled in the cylinder 2, the intake gas is compressed in a compression stroke. When fuel is injected from the fuel injection valve 3 at a late stage of the compression stroke, the fuel self-ignites and burns while involving the intake gas in the cylinder 2. After burning, exhaust gas is led to an exhaust system not illustrated, purified by an exhaust gas purifying device such as an exhaust gas purification catalyst and a filter, and then, the exhaust gas is discharged to atmospheric air.

The internal combustion engine 1 is provided with a well-known EGR device 10 which recirculates a part of the exhaust gas to an intake system, for reduction of NOx and improvement of fuel efficiency. The EGR device 10 includes an EGR cooler 11 which cools EGR gas taken out from the exhaust system. As known well, the EGR cooler 11 uses cooling water of the internal combustion engine 1 as refrigerant, and makes the refrigerant and the warm exhaust gas exchange heat therebetween to lower the temperature of the EGR gas. By lowering the temperature of the EGR gas, moisture included in the EGR gas is condensed. Due to this, condensed water is generated in the EGR cooler 11.

In order to collect and process condensed water generated in the EGR cooler 11, the internal combustion engine 1 is provided with a condensed water processing device 20. The condensed water processing device 20 comprises a storage tank 21 which stores condensed water CW; and a condensed water supply mechanism 22 as a condensed water supply device which supplies the condensed water CW stored in the storage tank 21 to the intake system of the internal combustion engine 1. The storage tank 21 is provided with a water level sensor 24 which outputs a signal according to the storage water quantity (the water level) of the condensed water CW stored in the storage tank 21. The condensed water supply mechanism 22 has a supply passage 25 connecting the storage tank 21 and each of the intake ports 5 and 6. The supply passage 25 divides at its downstream side into a first branched passage 25a which is connected with the first intake port 5 and a second branched passage 25b which is connected with the second intake port 6. At an end portion of each of the branched passages 25a and 25b, adding water valves 26 and 27 are provided so that the tips of the adding water valves 26 and 27 are exposed inside the intake ports 5 and 6 respectively. Further, the supply passage 25 is provided with a supply pump 28. It is possible to change the supply amount of water supplied to each of the first and second intake ports 5 and 6 by opening and closing each of the adding water valves 26 and 27 and adjusting a valve opening period for each of them. Each of the adding water valves 26 and 27 corresponds to a supply change device. The first branched passage 25a which supplies condensed water to the first intake port 5 corresponds to a first supply device. The second branched passage 25b which supplies condensed water to the second intake port 6 corresponds to a second supply device.

As mentioned above, the first intake port 5 makes intake gas flow into the central area 2a lying in the cylinder 2. Accordingly, by supplying condensed water to the first intake port 5 via the first branched passage 25a, it is possible to supply the condensed water limitedly to the central area 2a lying in the cylinder 2. In addition, by supplying condensed water to both of the intake ports 5 and 6 via the two branched passages 25a and 25b, it is possible to supply condensed water to a whole of the inside of the cylinder 2. Further, by supplying condensed water to the second intake port 6 via the second branched passage 25b, it is possible to supply condensed water limitedly to the peripheral area 2b lying in the cylinder 2. Thereby, it is possible to make the supply amount of condensed water supplied to the periphery area 2b lying in the cylinder 2 more than the supply amount of condensed water supplied to the central area 2a lying in the cylinder 2.

If the condensed water is supplied into the cylinder 2, the gas density of an area where the condensed water has been supplied decreases. Therefore, it is suppressed to decrease the spray penetration of fuel spray injected from the fuel injection valve 3, and as a result the fuel could easily stick on the wall surface of the cylinder 2. Especially, in a case where the fuel sticks on the wall surface of the cylinder 2 in the low load state of the internal combustion engine 1, the discharge amount of carbohydrate increases and thereby, the exhaust emission is deteriorated.

In a case where the fuel is injected from the central area 2a lying in the cylinder 2, like the international combustion engine 1, it is known that an area where the spray penetration of the fuel spray is affected by supply of condensed water into the cylinder is mainly the central area 2a lying in the cylinder 2, and the spray penetration of the fuel spray is less affected by supply of condensed water to the peripheral area 2b lying in the cylinder 2. With that, in the present embodiment, in a case where the storage water quantity of condensed water is in an excessive water state and superfluous condensed water is preferably consumed in the low load state of the internal combustion engine 1, the condensed water is supplied limitedly to the peripheral area 2b lying in the cylinder 2, where the spray penetration of fuel spray is less affected. That is, the supply amount of condensed water supplied to the peripheral area 2b lying in the cylinder 2 is made so as to be more than the supply amount of condensed water supplied to the central area 2a lying in the cylinder 2. Thereby, it is possible to consume the superfluous condensed water inside the cylinder 2 while suppressing the deterioration of exhaust emission.

As shown in FIG. 1, the internal combustion engine 1 is provided with an engine control unit (ECU) 30 configured as a computer which controls various portions of the internal combustion engine 1. The ECU 30 controls main operations of the fuel injection valve 3 and the like of the internal combustion engine 1. In the present embodiment, the ECU 30 is also used for processing of condensed water. To the ECU 30, signals are inputted from a lot of sensors which detect various physical amounts for obtaining the operating conditions of the internal combustion engine 1. For example, as the sensors relating to the present invention, a crank angle sensor 31, an accelerator opening degree sensor 32, and the like are provided to the internal combustion engine 1. The crank angle sensor 31 outputs a signal according to a crank angle of the internal combustion engine 1. The accelerator opening degree sensor 32 outputs a signal according to the depression amount (the accelerator opening degree) of an accelerator pedal 29 provided to the internal combustion engine 1. The output signals from these sensors are inputted to the ECU 30.

Figure 2:
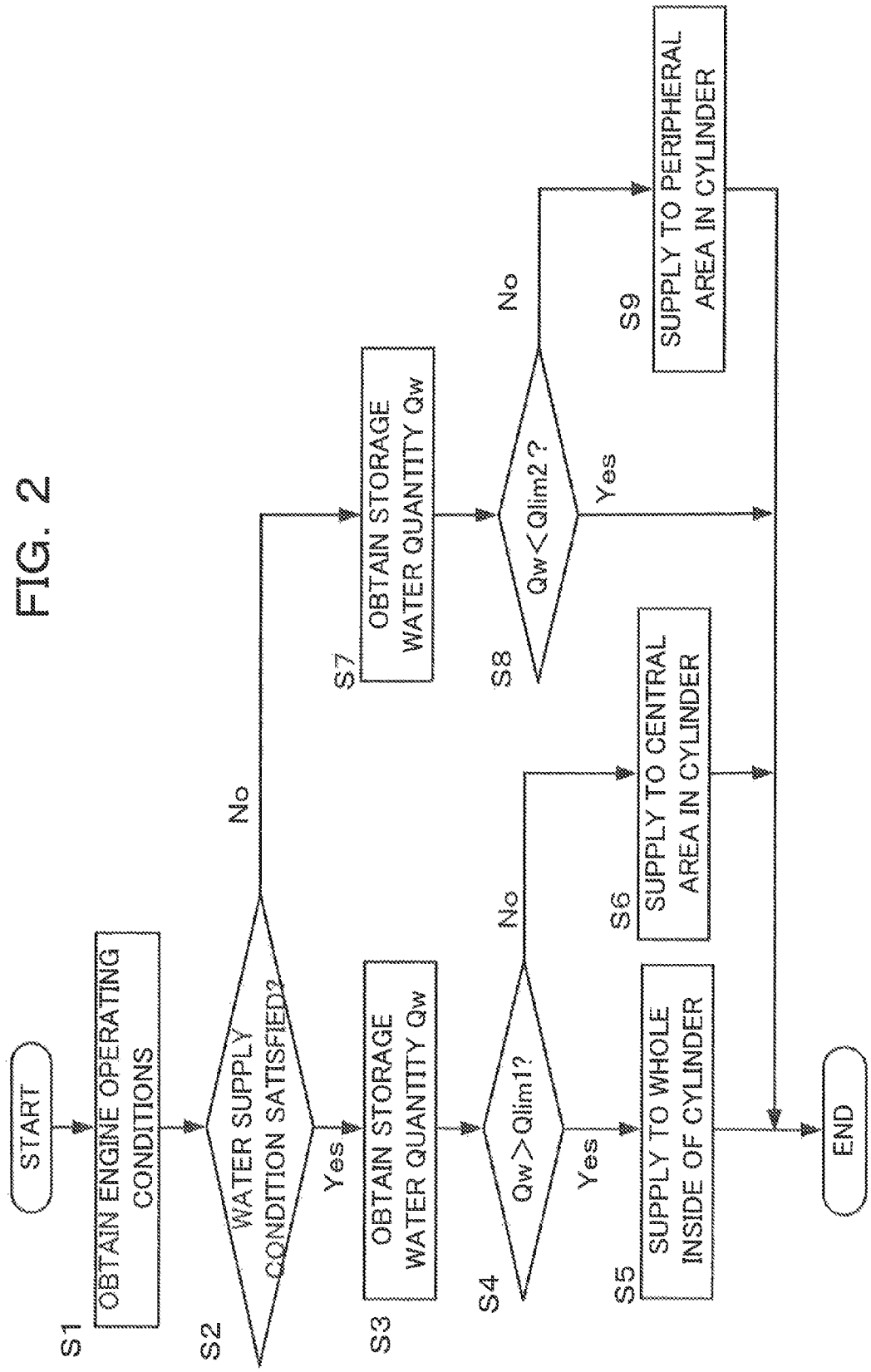
FIG. 2 is a flow chart showing one example of a control routine according to the first embodiment.

Control relating to the above mentioned supply of condensed water is realized by the ECU 30 which executes a control routine shown in FIG. 2. A computer program for the control routine shown in FIG. 2 is stored in the ECU 30. The computer program is read out as appropriate, and executed repeatedly at predetermined intervals. At step S1, the ECU 30 obtains engine operating conditions of the internal combustion engine 1. The ECU 30 obtains the engine speed and the load of the internal combustion engine 1 as the engine operating conditions. The ECU 30 obtains the engine speed by referring to the output signal from the crank angle sensor 31, and obtains the load by referring to the output signal from the accelerator opening degree sensor 32.

At step S2, the ECU 30 determines whether a water supply condition has been satisfied or not. The water supply condition is a condition for supplying condensed water to the internal combustion engine 1. Here, it is determined whether the water supply condition has been satisfied, depending on whether the load of the internal combustion engine 1 obtained at step S1 falls under a high load state where the load excesses a predetermined threshold. In a case where the water supply condition has been satisfied, the ECU 30 goes to step S3, and in a case where the water supply condition is not satisfied, the ECU 30 goes to step S7. In this control routine, the supply of condensed water is executed in a case where the load of the internal combustion engine 1 falls under the high load state, that is, the water supply condition has been satisfied. Thereby, it is possible to reduce effectively the smoke and the NOx with condensed water in the high load state where the smoke and the NOx are easily generated. If condensed water is supplied into the cylinder 2, the gas density of the area where the condensed water has been supplied decreases. Due to this, the fuel spray injected from the fuel injection valve 3 is easily diffused. Thereby, since air is promoted to be introduced into the fuel spray, the oxygen density at a moment of ignition increases. The higher the oxygen density at a moment of ignition is, the more the smoke generation decreases. Accordingly, by supplying condensed water into the cylinder 2, the smoke is reduced and the exhaust characteristic is improved.

At step S3, the ECU 30 obtains the storage water quantity Qw of the storage tank 21 by referring to the output signal from the water level sensor 24. At succeeding step S4, the ECU 30 determines whether the storage water quantity Qw of the storage tank 21 is beyond a lower limit quantity Qlim1. The lower limit quantity Qlim1 is a predetermined quantity for determining whether the storage water quantity Qw of the storage tank 21 is in an insufficient water state. In a case where the storage water quantity Qw is beyond the lower limit quantity Qlim1, it is unnecessary to save condensed water stored. Therefore, the ECU 30 goes to step S5. On the other hand, in a case where the storage water quantity Qw is equal to or lower than the lower limit quantity Qlim1, the ECU determines that the storage water quantity Qw is in the insufficient water state and goes to step S6.

At step S5, the ECU 30 opens each of the adding water valves 26 and 27 to supply condensed water to both of the first intake port 5 and the second intake port 6, so that the condensed water is supplied to the whole inside of the cylinder 2. On the other hand, at step S6, the ECU 30 opens the adding water valve 26 and closes the adding water valve 27 to supply condensed water only to the first intake port 5, so that the condensed water is supplied limitedly to the central area 2a lying in the cylinder 2. And then, the ECU 30 ends the control routine of this turn. At step S6, the valve opening period of the adding water valve 26 is controlled so that the supply amount of condensed water is made smaller than the supply amount of condensed water supplied to be supplied at step S5.

Since the area which affects combustion because of the supply of condensed water is mainly the central area 2a lying in the cylinder 2, in a case where the water supply condition has been satisfied and also the storage water quantity Qw is in the insufficient water state, condensed water is supplied limitedly to the central area 2a lying in the cylinder 2. As a result of that, the supply mount of condensed water to the peripheral area 2b lying in the cylinder 2 reduces. Therefore, it is possible to reduce the water supply quantity without deterioration of the exhaust characteristic while ensuring the mentioned effects obtained by the supply of condensed water. Thereby, it is possible to suppress the depletion of the storage tank 21 without the deterioration of the exhaust characteristic.

On the other hand, in the low load state that the load of the internal combustion engine 1 is equal to or less than the threshold, that is, the water supply condition is not satisfied, the ECU 30 obtains the storage water quantity Qw of the storage tank 21 by referring to the output signal from the water level sensor 24 at step S7. At succeeding step S8, the ECU 30 determines whether the storage water quantity Qw of the storage tank 21 is less than an upper limit quantity Qlim2. The upper limit quantity Qlim2 is a predetermined quantity for determining whether the storage water quantity Qw of the storage tank 21 is in an excessive water state that the storage water quantity Qw is excessive. In a case where the storage water quantity Qw is less than the upper limit quantity Qlim2, the condensed water stored in the storage tank 21 is not excessive. Accordingly, it is not necessary to consume the condensed water inside the cylinder 2. Therefore, the ECU 30 ends the control routine of this turn without supplying the condensed water to the cylinder 2. On the other hand, in a case where the storage water quantity Qw is equal to or more than the upper limit quantity Qlim2, the ECU 30 determines that the storage water quantity Qw is in the excessive water state and goes to step S9.

At step S9, the ECU 30 opens the adding water valve 27 and closes the adding water valve 26 to supply condensed water only to the second intake port 6, so that the condensed water is supplied limitedly to the peripheral area 2b lying in the cylinder 2. And then, the ECU 30 ends the control routine of this turn.

According to the control routine shown in FIG. 2, in a case of the low load state of the internal combustion engine 1 and also the excessive water state, condensed water is supplied limitedly to the peripheral area 2b lying in the cylinder 2. Accordingly, it is possible to supply condensed water into the cylinder 2 while suppressing the fuel sticking on the wall surface of the cylinder 2 by reducing impact on the spray penetration of the fuel spray. Thereby, also in a case of the low load state of the internal combustion engine 1, it is possible to consume condensed water inside the cylinder 2 while suppressing the deterioration of exhaust emission. The ECU functions as a condensed-water supply control device of the present invention by executing the control routine shown in FIG. 2.

A Second Embodiment

Next, a second embodiment of the present invention will be described in reference to FIGS. 3 and 4. The second embodiment is shared with the first embodiment except a method of supplying condensed water. Hereinafter, in FIG. 3, the same referential signs are assigned to the constructions shared with the first embodiment, and the explanation thereof will be omitted.

The condensed water supply mechanism 50 as a condensed water supply device provided in the second embodiment comprises a supply passage 51 for supplying condensed water of the storage tank 21 to the internal combustion engine 1. The supply passage 51 divides at its downstream side into a first branched passage 51a which is connected with the cylinder 2 and a second branched passage 51b which is connected with an intake passage 53 lying at the upstream side of the intake ports 5 and 6. At an end portion of the first branched passage 51a, an adding water valve 56 is provided in a state that the tip thereof is exposed inside the cylinder 2 and faces in a direction along the peripheral area 2b lying in the cylinder 2. On the other hand, at an end portion of the second branched passage 51b, an adding water valve 57 is provided in a state that the tip thereof is exposed inside the intake passage 53. Further, the supply passage 51 is provided with a supply pump 58.

Figure 3:
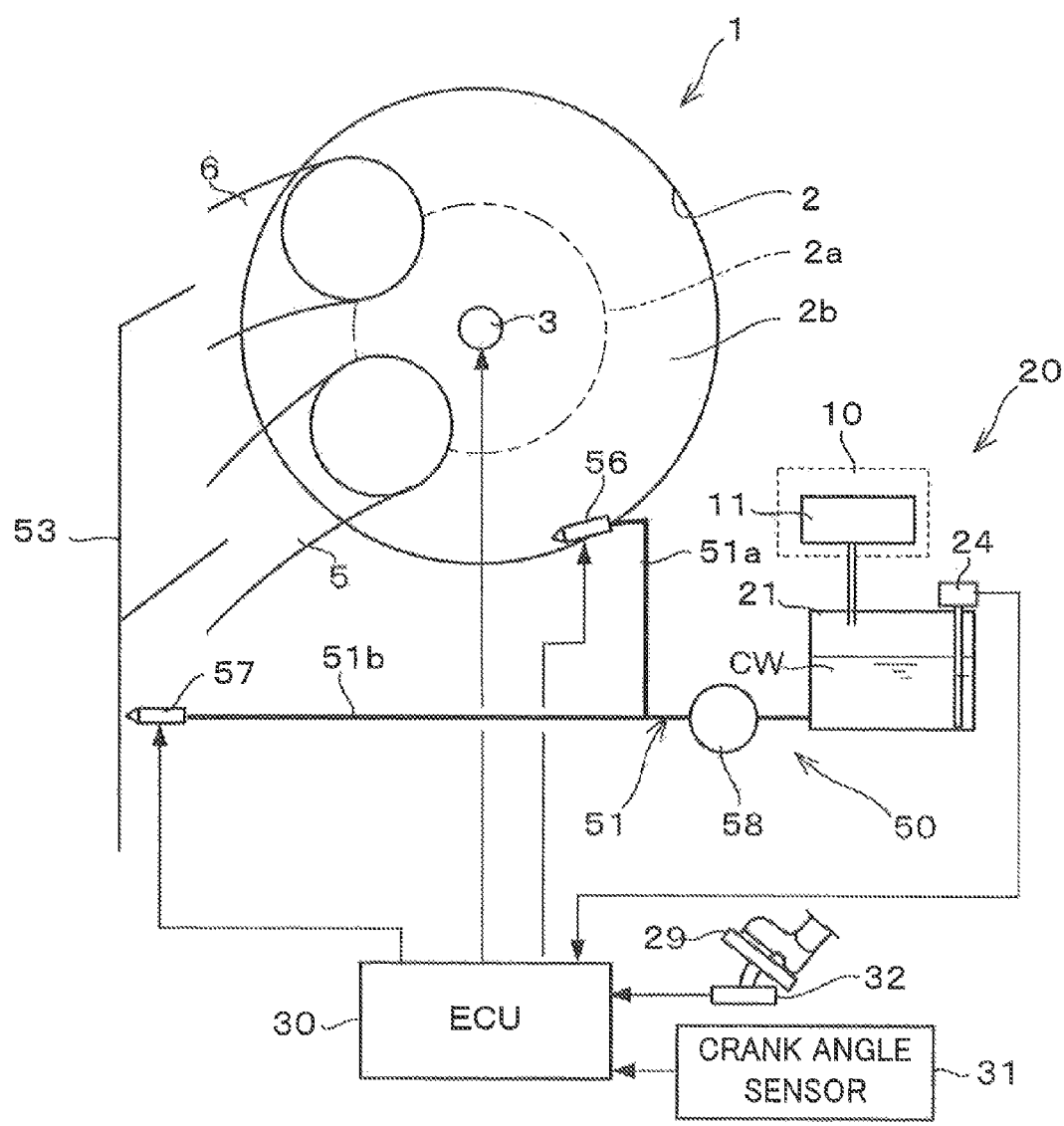
FIG. 3 is a configuration diagram showing schematically an essential portion of an internal combustion engine where a condensed water supply control apparatus according to a second embodiment of the present invention is applied.

According to the configuration shown in FIG. 3, by closing the adding water valve 57 while opening the adding water valve 56, it is possible to supply condensed water limitedly to the peripheral area 2b lying in the cylinder 2. On the other hand, by opening the adding water valve 57 while closing the adding water vale 56, condensed water is introduced to each intake port 5, 6 from the intake passage 53. Due to this, it is possible to supply the condensed water to the whole inside of the cylinder 2.

Control of the adding water valves 56 and 57 is realized by the ECU 30 which executes a control routine shown in FIG. 4. A computer program for the control routine shown in FIG. 4 is stored in the ECU 30, and read out as appropriate to be executed repeatedly at predetermined intervals. At step S21, the ECU 30 obtains engine operating conditions of the internal combustion engine 1. The ECU 30 obtains, as the engine operating conditions, the engine speed and the load of the internal combustion engine 1. The ECU 30 obtains the engine speed by referring to the output signal from the crank angle sensor 31, and obtains the load of the internal combustion engine 1 by referring to the output signal from the accelerator opening degree sensor 32.

At step S22, the ECU 30 determines whether a water supply condition, which is a condition for supplying condensed water to the internal combustion engine 1, has been satisfied or not. Here, it is determined whether the water supply condition has been satisfied, depending on whether the load of the internal combustion engine 1 obtained at step S21 falls under a high load state that the load is beyond a predetermined threshold. In a case where the water supply condition has been satisfied, the ECU 30 goes to step 23, and opens the adding water valve 57 with closing the adding water valve 56, so that the condensed water is supplied to the whole inside of the cylinder 2. On the other hand, in a case where the water supply condition is not satisfied, it means that the load of the internal combustion engine 1 falls under a low load state where the load is equal to or lower than the threshold. With that, the ECU 30 goes to step S24.

At step S24, the ECU 30 obtains the storage water quantity Qw of the storage tank 21 by referring to the output signal from the water level sensor 24. At succeeding step S25, the ECU 30 determines whether the storage water quantity Qw of the storage tank 21 is less than an upper limit quantity Qlim or not. The upper limit quantity Qlim is a predetermined quantity for determining whether the storage water quantity Qw of the storage tank 21 is excessive, that is, in an excessive water state. In a case where the storage water quantity Qw is less than the upper limit quantity Qlim, the condensed water stored in the storage tank 21 is not excessive. Accordingly, it is not necessary to consume the condensed water inside the cylinder 2. Due to this, the ECU 30 ends the control routine of this turn without supplying the condensed water into the cylinder 2. On the other hand, in a case where the storage water quantity Qw is equal to or more than the upper limit quantity Qlim, the ECU 30 determines the storage water quantity Qw is in the excessive water state, and goes to step S26.

At step S26, the ECU 30 opens the adding water valve 56 and also closes the adding water valve 57, so that the condensed water is supplied limitedly to the peripheral area 2*b* lying in the cylinder 2. And then, the ECU 30 ends the control routine of this turn.

According to the control routine shown in FIG. 4, as with the first embodiment, in a case where the internal combustion engine 1 is in the low load state and also the storage water quantity is in the excessive water state, condensed water is supplied limited to the peripheral area 2*b* lying in the cylinder 2. Therefore, it is possible to supply condensed water while suppressing fuel sticking on the wall surface of the cylinder 2 by reducing impact on the spray penetration of the fuel spray. Thereby, it is possible to consume condensed water in the cylinder 2 while suppressing the deterioration of exhaust emission even in the low load state of the internal combustion engine 1. The ECU 30 functions as a condensed-water supply control device of the present invention by executing the control routine shown in FIG. 4.

The present invention is not limited to the above embodiments and may be executed in various embodiments as long as within the subject of invention. In each of the above embodiments, in the case of the low load state of the internal combustion engine 1 and also the excessive water state, condensed water is supplied limitedly to the peripheral area lying in the cylinder. However, as long as the supply amount of condensed water supplied to the peripheral area of the cylinder is made more than the supply amount of condensed water supplied to the central area of the cylinder, the present invention may be also applied to such an embodiment that in a case of the low load state of the internal combustion engine and the excessive water state, condensed water is supplied to an inner circumferential area lying in the cylinder.

The invention claimed is:

1. A condensed-water supply control apparatus for an in-cylinder injection type internal combustion engine, the condensed-water supply control apparatus being applied to the in-cylinder injection type internal combustion engine where fuel is injected from a fuel injector toward a central area lying in a cylinder, and comprising:
    a storage tank which stores condensed water generated at a part of the in-cylinder injection type internal combustion engine;
    a water supply system configured to supply the condensed water stored in the storage tank into the cylinder via a plurality of water injection valves, the plurality of water injection valves including at least one water injection valve configured to adjust a supply amount of condensed water directed toward the central area lying in the cylinder, and at least one other water injection valve configured to adjust a supply amount of condensed water directed toward the peripheral area lying in the cylinder; and
    a computer programmed to control each of the supply amounts of condensed water directed into the cylinder during a low load state of the in-cylinder injection type internal combustion engine, such that the supply amount of condensed water directed toward the peripheral area lying in the cylinder is made larger with respect to the supply amount of condensed water directed toward the central area lying in the cylinder.

2. The condensed-water supply control apparatus according to claim 1, wherein the computer is programmed to control the amount of condensed water supplied to the cylinder, when a storage water quantity of the storage tank is in an excessive water state in which the storage water quantity is equal to or more than a predetermined quantity.

3. The condensed-water supply control apparatus according to claim 1, wherein the computer is programmed to limitedly control the amount of condensed water directed toward the peripheral area lying in the cylinder such that the supply amount of condensed water directed toward the peripheral area lying in the cylinder is made larger with respect to the supply amount of condensed water directed toward the central area lying in the cylinder.

4. The condensed-water supply control apparatus according to claim 1, wherein the in-cylinder injection type internal combustion engine further comprises:
    a first intake port which directs a flow of intake gas toward the central area lying in the cylinder;
    a second intake port which directs a flow of intake gas toward the peripheral area lying in the cylinder;
    wherein the at least one water injection valve is a first valve configured to supply condensed water to the first intake port; and
    the at least one other water injection valve is a second valve configured to direct condensed water toward the peripheral area lying in the cylinder,
    wherein the computer is programmed to change an amount of condensed water supplied to each of the first and second valves.

5. The condensed-water supply control apparatus according to claim 4, wherein
    the in-cylinder injection type internal combustion engine has an intake passage which divides into the first intake port and the second intake port; and
    the first valve is provided to the first intake port at a location downstream of where the intake passage divides into the first intake port and the second intake port.

6. The condensed-water supply control apparatus according to claim 5, wherein
    the second valve is provided to the second intake port.

7. The condensed-water supply control apparatus according to claim 4, wherein
    the first valve is provided so as to face in a direction along the peripheral area lying in the cylinder.

8. The condensed-water supply control apparatus according to claim 7, wherein
    the in-cylinder injection type internal combustion engine has an intake passage which divides into the first intake port and the second intake port; and
    the second valve is provided to the intake passage at a location upstream from where the intake passage divides into the first intake port and the second intake port.

* * * * *